Sept. 14, 1937.  E. M. FRASER  2,093,077
ELECTRIC MACHINE
Filed March 28, 1936  2 Sheets-Sheet 2
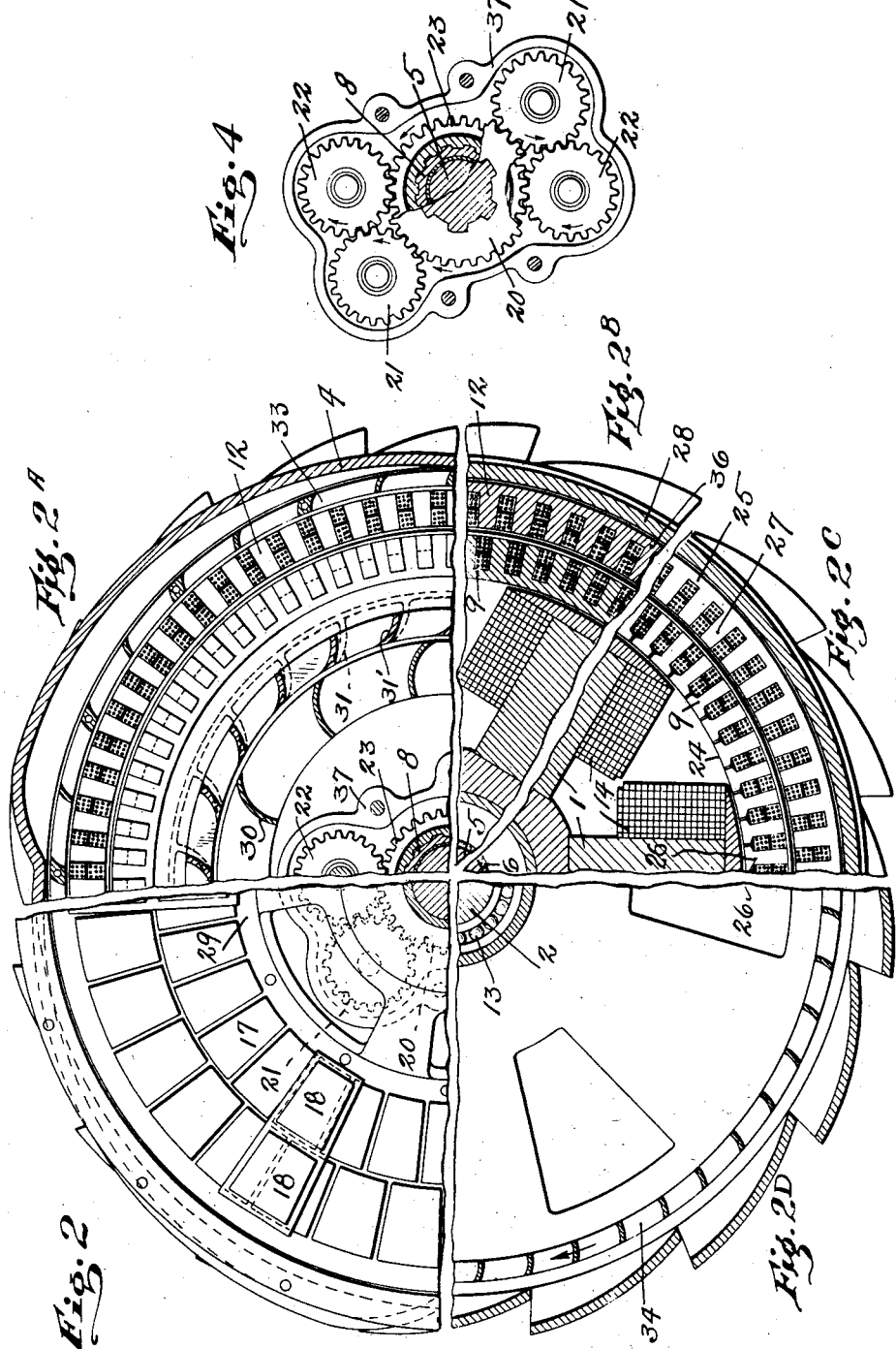
INVENTOR
Ethelbert M. Fraser
BY
Liddle, Bethell and Montgomery
ATTORNEYS.

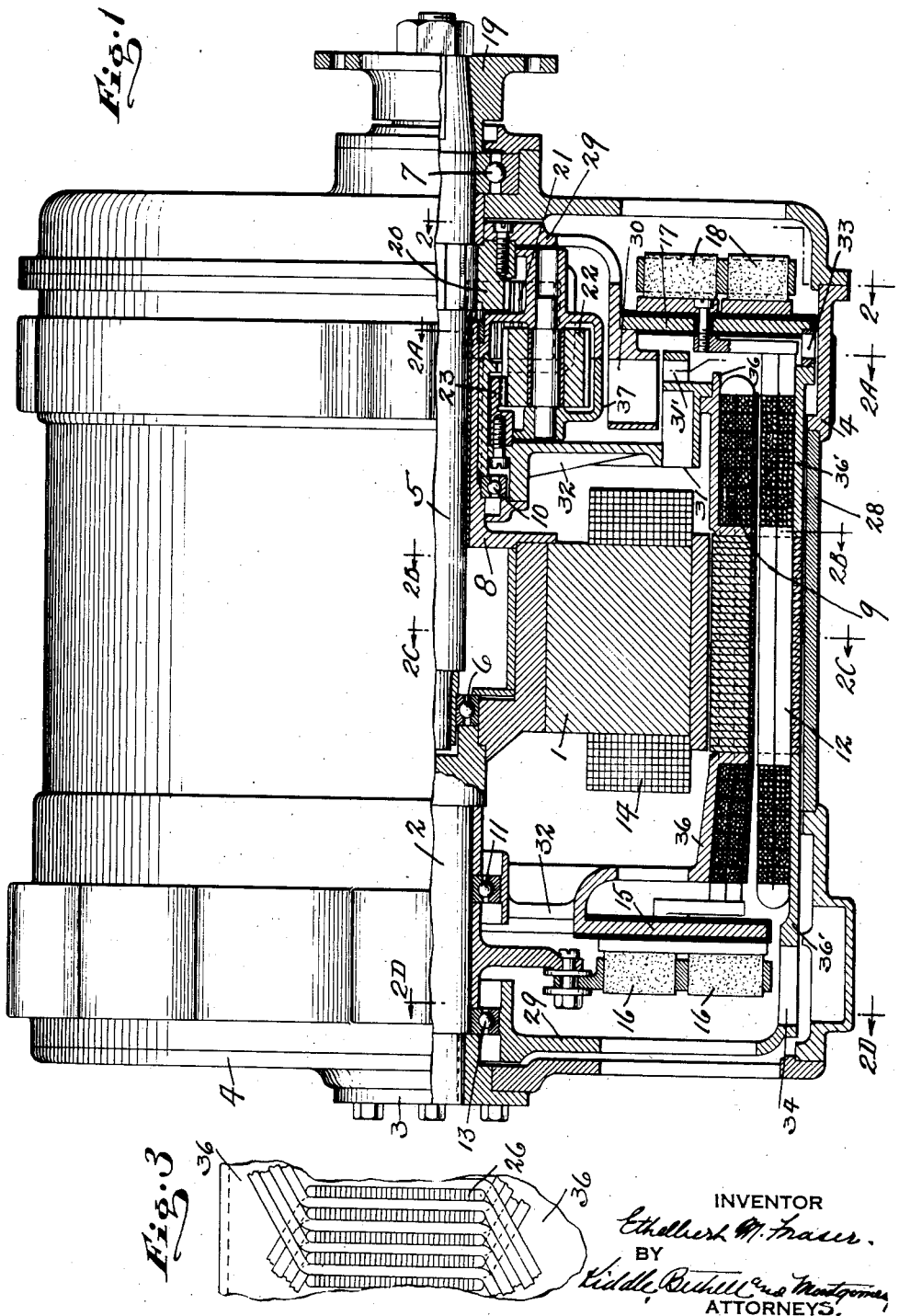

Patented Sept. 14, 1937

2,093,077

UNITED STATES PATENT OFFICE 2,093,077

ELECTRIC MACHINE

Ethelbert M. Fraser, Yonkers, N. Y.; Dorothy Fraser, administratrix of said Ethelbert M. Fraser, deceased, assignor to William S. Murray and Henry Flood, Jr., New York, N. Y., copartners doing business under firm name of Murray & Flood Application March 28, 1936, Serial No. 71,387

11 Claims. (Cl. 171—252)

This invention relates to an improvement in electric machines designed for generating electric power when mechanical power is applied to it and also for the purpose of supplying mechanical power when electric power is applied to it.

In general, my improved machine comprises two armatures of special construction, these armatures being disposed one within the other and rotatable about a common axis, means being provided whereby the armatures are obliged to rotate in opposite directions at all times. A field structure or magnetic field system is embodied in my machine common to both armatures.

The machine of this invention is so constructed and arranged that mechanical power can be converted to electric power in a very efficient manner. Armature reaction and field distortion are completely neutralized and the machine is very small and light in construction as compared with prior types of electric machines.

The present invention also provides an electric machine which is so constructed and arranged that a large cooling surface is provided to carry off the heat lost in the generation of heavy currents.

The accompanying drawings illustrate one embodiment of my invention:

Fig. 1 is a view in part sectional elevation of the entire machine;

Fig. 2 is a section on the line 2—2 of Fig. 1;
Fig. 2A is a section on the line 2A—2A of Fig. 1;
Fig. 2B is a section on the line 2B—2B of Fig. 1;
Fig. 2C is a section on the line 2C—2C of Fig. 1;
Fig. 2D is a section on the line 2D—2D of Fig. 1;

Fig. 3 is a developed view of the armature construction employed; and

Fig. 4 is a view in part sectional elevation of the gear set by which opposite rotation of the two armatures of my machine is obtained.

Referring to the drawings in detail, 1, Figs. 1 and 2, designates a stationary field magnet structure which is supported at one end by a quill shaft 2, Figs. 1 and 2D, secured by a flange 3, Fig. 1, to the case 4, Figs. 1 and 2A, of the machine.

5, Figs. 1 and 2C, designates a rotatable shaft in line with the stationary quill shaft 2, Figs. 1 and 2D, this shaft 5 being carried in bearings 6 and 7, Fig. 1. A bronze lined flanged sleeve or quill shaft 8, Figs. 1 and 2A telescopes the shaft 5 and supports the end of the field structure opposite the quill shaft 2.

Power is supplied to the shaft 5, Figs. 1, 2B and 4, when the machine is converting mechanical power into electrical energy and power is taken off this shaft when the machine is operating as an electric motor.

9, Figs. 1 and 2B, designates the inner of two armatures surrounding the field structure 1. This armature, as will be brought out hereinafter, is of special construction and is supported in bearings 10 and 11, Fig. 1, the supporting and driving spiders therefor being designated 32.

12, Figs. 1 and 2B, designates the outer armature, this outer armature surrounding the inner armature 9, Figs. 1 and 2B, the two armatures being disposed in concentric relation. The armature 12, Figs. 1 and 2A, is supported in part by the shaft 5, Figs. 1 and 2B, and in part by the quill shaft 2, Figs. 1 and 2D, on bearings 7 and 13, Figs. 1 and 2D, the supporting spiders for this armature being designated 29, Figs. 1 and 2.

The coils of the stationary field magnet structure 1 above referred to are designated 14, Figs. 1 and 2C.

The commutator for the inner armature 9, Figs. 1 and 2B, is designated 15, Fig. 1, and the cooperating brushes 16, Fig. 1, while 17, Figs. 1 and 2, designates the commutator for the outer armature 12, Figs. 1 and 2B. Brushes 18, Figs. 1 and 2, cooperate with this commutator.

When it is desired to operate my improved electric machine as a generator the inner armature 9, Figs. 1 and 2B, and the outer armature 12, Figs. 1 and 2B, are rotated by power supplied through a flange 19, Fig. 1, secured to the shaft 5, Figs. 1 and 2B. The outer armature 12, Figs. 1 and 2B, is driven directly off the shaft 5, Figs. 1 and 2B, and rotates at all times in the direction of rotation of this shaft. The armature 9, Figs. 1 and 2B, is obliged to rotate at all times oppositely to the armature 12, Figs. 1 and 2B, and to accomplish this end a gear set is interposed between the shaft 5, Figs. 1 and 2B, and armature 9, Figs. 1 and 2B. This gear set comprises a gear 20, Figs. 1, 2B and 4, keyed or otherwise fixed to the shaft 5, Figs. 1, 2B and 4, and meshing with pinions 21, Figs. 1, 2 and 4, rotatable on small shafts secured to the casing 37, Figs. 1, 2A and 4. One end of the pinions 21, Figs. 1, 2 and 4, meshes with pinions 22, Figs. 1, 2A and 4, also rotatable on shafts secured to the casing 37, Figs. 1, 2A and 4. The pinions 22, Figs. 1, 2A and 4, in turn mesh with a gear 23, Figs. 1, 2A and 4, which, as will be seen from the drawings, is secured to the spider 32, Fig. 1, of the inner armature 9. Figs. 1 and 2B.

It will be quite apparent that through this gear set the inner armature 9, Figs. 1 and 2B, will always be rotated oppositely to the shaft 5, Figs.

1 and 2B, and hence to the armature 12, Figs. 1 and 2B.

It will be understood of course that the relative speeds of the oppositely rotated armatures 9 and 12 will depend upon the ratio of gears of the gear set just described and that the desired relative speed will depend upon the ratio between the conductors of one armature and those of the other. The two armatures will be rotated at the same speed when there are an equal number of conductors on the two armatures, both armatures generating the same current at the same voltage, there then being the same ampere turns on each armature.

It will be apparent also that by reason of the fact that the two armatures are rotated in opposite directions the currents flow in opposite directions so that the magnetic poles set up by each armature are of opposite polarity and cancel each other out, so that there is no effect on the poles of the main field magnet 1, Figs. 1 and 2C, and no distortion regardless of what armature current is being carried by the armatures.

When the armatures are connected in series and it is desired to rotate the armatures at a 2:1 speed, for example, the number of conductors on one armature must be the same as that on the other to obtain complete compensation. When the armatures are to be connected in multiple, under the same relative speed conditions, then the faster running armature must have one-half the number of conductors to generate the same voltage, and the resistance of the winding of the faster running armature must be such as to carry double the current of that of the slower armature. The ampere turns of each armature however, will be the same, although one armature is doing twice as much work as the other. In other words, where the oppositely rotating armatures are running at different relative speeds, with a series armature connection, the number of ampere turns on the armatures must be the same; with a multiple connection the number of turns and armature resistance must be so proportioned to the relative speeds of the two armatures as to obtain the same number of ampere turns on each armature independent of the load.

As above mentioned, the armatures 9, Figs. 1 and 2B, and 12, Figs. 1 and 2B, are of special construction. The armature 9, Figs. 1 and 2B, is a laminated structure made up of toothed rings 24, Fig. 2C, the teeth being designated 26, Fig. 2C; while the armature 12, Figs. 1 and 2C, is a laminated structure made up of toothed rings 25, Fig. 2C, the teeth being designated 27, Fig. 2C.

It is to be understood that the two armatures are alike in construction and from Fig. 3 it will be seen that the end plates 36, Figs. 1, 2B and 3, of the armature 9, Figs. 1 and 2B, are secured to the supporting and driving spiders 32, Figs. 1 and 2, of this armature, the armature heads 36', Fig. 1, of the outer armature 12, Figs. 1 and 2B, being secured to the driving and supporting spiders 29, Fig. 1, of this armature.

It will be seen from Fig. 3 that the armature heads are toothed and that when the coils or windings of the armature are placed in position these windings cross each other to clamp the teeth or lugs of the armature heads.

In manufacture the spiders of each armature, the toothed rings and the armature coils are assembled and the complete assembly impregnated, the impregnating material being solidified by the application of heat so that the assembly, so far as the components of each armature are concerned, becomes one solid mass.

As will be seen from Fig. 2C, for example, the solid periphery of the rings 25, Fig. 2C, of the armature 12, Figs. 1 and 2B, lies adjacent the surrounding yoke 28, Figs. 1 and 2B, so that there is a uniform flow of flux between the armature and yoke and no eddy currents will flow in the yoke face. Similarly the solid inner periphery of the rings 24, Fig. 2C, of the inner armature 9 lies adjacent the face of the poles of the field magnet structure 1, Figs. 1 and 2C.

Attached to one of the driving and supporting spiders 29, Figs. 1 and 2, of the outer armature 12, Figs. 1 and 2B, are fan blades 30, Figs. 1 and 2A, so arranged as to cause air to flow from outside the casing 4, Figs. 1 and 2A, of the apparatus into a fan 31, Figs. 1 and 2A, which is an integral part of one of the driving and supporting spiders 32, Fig. 1, of the inner armature 9, Figs. 1 and 2C. The fan blades 30, Figs. 1 and 2A, and 31, Figs. 1 and 2A, are shaped to function as an air turbine and inasmuch as the fans and connected armatures always rotate in opposite directions air circulation is increased.

The fans 30, Figs. 1 and 2A, and 31, Figs. 1 and 2A, supply air to the field coils 14, Figs. 1 and 2C, as well as to the air gap between the field poles and the inner armature 9, Figs. 1 and 2C, and the air gap between the armatures 9, Figs. 1 and 2C, and 12, Figs. 1 and 2C. These fans together with fan 31' also supply air to the back of the commutator 17, Fig. 1, for the outer armature 12, Figs. 1 and 2B. In addition to these fans I also provide a fan 33, Figs. 1 and 2A, for supplying air to the gap between the armature 12, Figs. 1 and 2B, and the yoke 28, Figs. 1 and 2B, while a fan 34, Fig. 1, which is at the other end of the machine acts as an exhaust fan.

It is to be understood that changes may be made in the details of construction and arrangement of parts hereinabove described without departing from the spirit and scope of my invention.

What I claim is:—

1. An electric machine comprising in combination two rotatable concentric armatures, a non-rotatable field structure common to said armatures, and means for effecting rotation of said armatures about a common axis simultaneously and at all times in opposite directions.

2. An electric machine comprising in combination two rotatable concentric armatures, a stationary field structure for said armatures, and a gear set within the machine gearing said armatures to each other whereby upon rotation of the armatures the same will always rotate in opposite directions.

3. An electric machine comprising in combination two concentric rotatable armatures disposed in inductive relation to each other, means for rotating said armatures at all times in opposite direction and at different relative speeds, the armature windings being in such relation to the speed as to effect complete armature compensation.

4. An electric machine comprising in combination two concentric rotatable armatures disposed in inductive relation to each other, a field structure common to said armatures, means for rotating said armatures at all times in opposite directions and at different relative speeds, the armature windings being in such relation to the speed as to effect complete armature compensation.

5. In an electric machine the combination of two concentric armatures, a stationary field structure common to both armatures, a rotatable shaft for directly driving one of said armatures, and a gear train connecting the two armatures whereby said armatures will always be rotated simultaneously in opposite directions.

6. In an electric machine the combination of two armatures, one inside the other, bearings for each armature in which said armatures are independently rotatable, a field structure common to both armatures, and means for compelling opposite rotation of said armatures at all times.

7. An electric machine comprising in combination two armatures, a stationary field common to said armatures, means for always rotating said armatures in opposite directions, a yoke for said armatures, and a fan for forcing air through the gap between the armatures, between the armatures and said yoke and between the armatures and the poles of said field.

8. An electric machine comprising in combination two armatures, means for effecting rotation of said armatures at all times in opposite directions, a stationary field structure for said armatures, a casing for said machine, a stationary support for said field structure attached at one end to said casing, and a rotating shaft at the other end of said casing for the support of the other end of said stationary support.

9. An electric machine comprising in combination two concentric armatures in inductive relation, a non-rotatable field for said armatures, a direct external drive for one of said armatures, and a gear set intermediate said armatures for effecting rotation of the other of said armatures in a direction opposite to the direction of rotation of the first mentioned armature.

10. The method of compensating armature reaction in an electric machine which comprises rotating two armature windings disposed in inductive relation in opposite directions through a common field flux, the magneto-motive force of said windings being substantially equal but opposite.

11. An armature for electric machines, said armature comprising in combination a plurality of toothed rings disposed to provide a laminated structure, a driving and supporting spider for each end of the armature, said spiders providing the end plates for the armature, armature coils disposed in the spaces between the teeth of the armature, said end plates being toothed and said coils crossing each other behind the teeth of the armature end plates to clamp the plates and rings to each other, said structure being impregnated and filled with solidified insulating material.

ETHELBERT M. FRASER.